United States Patent [19]

Berlin et al.

[11] Patent Number: 5,330,787
[45] Date of Patent: Jul. 19, 1994

[54] POLISH COMPOSITION FORMING HYDROPHILIC LAYER AND SPRAY-AWAY POLISHING PROCESS

[75] Inventors: David R. Berlin, Huntington, Conn.; Bonnie A. Rishel, Yorktown Heights; Richard R. Wolstoncroft, Mt. Kisco, both of N.Y.

[73] Assignee: First Brands Corporation, Danbury, Conn.

[21] Appl. No.: 800,949

[22] Filed: Dec. 2, 1991

[51] Int. Cl.5 .............................. B65B 33/00
[52] U.S. Cl. ........................ 427/154; 106/3; 106/10; 106/287.11; 106/287.13; 427/353; 427/387; 524/277
[58] Field of Search .......... 106/7, 10, 287.11, 287.13; 427/385, 387, 154, 353; 524/277

[56] References Cited

U.S. PATENT DOCUMENTS

| 4,113,677 | 9/1978 | Suedas et al. | 524/399 X |
| 4,218,250 | 8/1980 | Kasprzak | 525/477 X |
| 4,247,330 | 1/1981 | Sanders | 106/3 |
| 4,600,436 | 7/1986 | Traver et al. | 106/3 |
| 5,098,745 | 3/1992 | Gordon | 427/385 |

Primary Examiner—Michael Lusignan
Attorney, Agent, or Firm—Gary L. Wamer

[57] ABSTRACT

A multi-component polish composition and polishing process for a surface. The polish composition comprises a multi-component mixture which when applied to a surface, e.g., the painted surface of a vehicle, under effective drying conditions forms a substantially dry hydrophilic wax-containing film which may be substantially removed from the surface by water rinsing of the surface whereby a hydrophobic protective layer is provided to the surface.

22 Claims, No Drawings

POLISH COMPOSITION FORMING HYDROPHILIC LAYER AND SPRAY-AWAY POLISHING PROCESS

FIELD OF THE INVENTION

The instant invention relates to a dramatically new concept for polish compositions and polishing processes for painted surfaces, e.g., the painted surface may be that of a vehicle, such as a car, truck, motorcycle or boat. The invention provides a polish composition which is applied by applying it to a painted surface and then rinsing off with water the dried film that forms. The polish composition provides a hydrophobic protective layer to the surface.

BACKGROUND OF THE INVENTION

The use of polishing compositions for providing a protective coating to painted surfaces is well known for providing luster and protection. Many so called "wax" or polish compositions are known as evidenced by U.S. Pat. Nos. 3,645,946, 3,836,371, 4,113,677, 4,247,330 and 4,592,934. The prior art polish compositions have been employed in two distinct ways. The most time honored application of a polish composition to a painted surface has involved application of a solid or liquid polish composition to a painted surface. The polish composition is then permitted to dry whereby an adherent wax-containing film is formed which must be removed by buffing. For example, U.S. Pat. No. 4,592,934 discloses such a polish composition and application/removal process. Alternatively, water dispersible polish compositions have been formulated for use in car wash facilities whereby components of the polish composition are provided in an aqueous spray. For example, U.S. Pat. No. 3,645,946 discloses such an aqueous-based polish composition.

U.S. Pat. No. 3,645, 946 (Lyman) discloses a polish composition which contains a silicone, a cationic surfactant and other ingredients. The inclusion of a quaternary ammonium cationic surfactant is said to promote the adhesion of silicone to the surface.

U.S. Pat. No. 3,836,371 (Kokoszka) discloses a polish containing a specific hydroxyl endblocked polydimethylsiloxane with at least one member selected from the group consisting of waxes, solvents, surfactants, thickening agents, abrasives, dyes, odorants, and other ingredients normally used in making polishes.

U.S. Pat. No. 3,847,622 (Brandl et al.) discloses a polish composition comprising a wax, a mixture of organopolysiloxanes, a solvent, amine functional silicones, cationic surfactants, perfumes and stabilizers.

U.S. Pat. No. 4,113,677 (Svedas et al.) discloses a hot water applied polish composition comprising an aminofunctional silicone, a dimethyl silicone, a microcrystalline wax, acetic acid, alcohol and other components. The polish composition of U.S. Pat. No. 4,113,677 is employed only as an aqueously dispersed polish, e.g., the type employed at commercial car washes. There is no paste or liquid polish composition for rub-on application to a painted surface. Further, the concentrations of the aminofunctional silicone and microcrystalline wax are not correlated to provide any beneficial removal process, since no dried film will form during use of the substantially aqueous polish composition; i.e., the polish is applied by spraying it on in a large volume of water.

U.S. Pat. No. 4,354,871 (Sutton) discloses a furniture polish composition comprising a cationic surfactant, a solvent, polydimethylsiloxane, wax resin and a non-drying oil. The cationic surfactant may be a quaternary ammonium compound.

Although the aforementioned compositions and processes have been successfully employed for decades, the need for an easier "do-it-yourselfer" polish composition and process for application and removal of polish compositions has continued. Several reasons for this continuing need exist. First, the application of conventional polish compositions typically require the application of the polish composition as a paste or liquid to a painted surface and removal of the dried wax film by difficult buffing. The dried wax film tends to lodge in cracks, crevices and around the numerous indicia on automotive surfaces. The net result is a difficult to remove dried film which involves considerable time and effort by the user. Second, since conventional polish compositions must be removed relatively soon after drying to prevent their tendency to tenaciously adhere to the painted surface, the user of conventional polish compositions is constantly applying and buffing so as to avoid letting the polish composition become difficult to remove. Third, the use of polish compositions applied as an aqueous spray do not tend to provide the user with the sense of cleaning and protection afforded by a "rub-on" polish composition. Fourth, such aqueously applied compositions do not tend to have comparable bulk concentrations for the functional components of the wax composition, do not tend to provide residual amounts of such functional components as great as that provided by wax compositions owing to the lower concentrations and shorter period of time such are in contact with the painted surface, and do not impart the cleaning action which results from rubbing a polish on a surface.

The instant process provides a new polish composition and process for its application and removal. The instant polish composition and polishing process is to be distinguished from the prior art by its use of correlated effective amounts of an aminofunctional silicone and wax, and optionally a dimethyl silicone, whereby a polish composition is provided which after application to a painted surface forms a hydrophilic, dried film removable by rinsing the surface with water. In one embodiment after removal of the dried film with water rinsing a protective coating is provided as aminofunctional silicone and wax are retained on the painted surface. The water rinsed, painted surface may then be dried, if desired, to prevent possible water spotting which might result from minerals contained in the rinse water.

SUMMARY OF THE INVENTION

The instant invention is a dramatic break with polish compositions and the use in polishing processes as heretofore known in the prior art. The instant invention provides for the first time a rub-on paste or liquid multicomponent polish composition which when dry provides a "spray-away" dried film. The term "spray-away" is employed herein to denote water rinsing of a hydrophilic dry film from a surface. Heretofore, polish compositions which formed dried films after application were removed by strenuous buffing with a dry cloth. The instant invention obviates the need for buffing by correlating the effective amounts of the components of the polish composition so as to provide a dry, preferably wax-containing hydrophilic film after application to a surface, preferably a painted surface of an automobile or truck whereby the dry film may be substantially removed by rinsing the dry film away with water until a substantially hydrophobic surface is obtained.

In one embodiment the instant invention relates to a multi-component polish composition for a painted surface having correlated effective amounts of a wax component and an aminofunctional silicone and, optionally a dimethyl silicone component. In a further embodiment a phase-out agent is employed to assist in formation of the spray-away, hydrophilic dry film which is more easily removable by rinsing with water. The aforementioned components are present in correlated effective amounts whereby the affinity of the wax and aminofunctional silicone for the painted surface is such that the dried wax-containing film may be substantially removed by rinsing the surface with water, i.e., simply "sprayed-away".

DETAILED DESCRIPTION OF THE INVENTION

The instant invention provides a novel multi-component polish composition and a new concept in polishing processes. The instant invention provides unique rub-on paste or liquid polish compositions which when dry provide a "spray-away" dried film. The term "spray-away" is employed herein to denote water rinsing of a hydrophilic dry film from a surface, preferably a wax-containing hydrophilic film from a painted surface. Heretofore, polish compositions which formed dried films after application were removed by difficult and time consuming buffing with a dry cloth. The instant invention obviates the need for strenuous buffing by correlating the effective amounts of the components of a multi-component polish composition so as to provide a dry, hydrophilic film after application to a surface and drying under effective drying conditions whereby the hydrophilic dry film may be moved by rinsing the dry film away with water until a substantially hydrophobic painted surface is obtained. The hydrophobic nature of the surface is readily ascertained by observing the water beading characteristics of the painted surface. In addition, the unique concentration profile of the various compositional components of the instant invention results in polish compositions having low volatile organic compounds ("VOC"s). VOCs are generally characterized as organic compounds having a vapor pressure of less than about 0.1 mm Hg at 1 atm pressure and at 20° C. or twelve (12) or less carbon atoms if the vapor pressure is unknown. The polish compositions of this invention are typically characterized by less than 10 weight percent VOCs, preferably less than about 7 weight percent, as compared to typical commercially available polish compositions which typically contain 15 to about 75% VOCs. A reduction in VOCs is beneficial to both the user of polish compositions and to current environmental efforts to reduce VOC emissions from consumer products. Further, the instant polish compositions have been observed to have a lower pH than observed for other commercial polishes and typically have a final pH of between about 3.5 and about 7.0, preferably between about 4.0 to about 5.0.

The instant invention relates generally to a polish composition for a surface which is to be treated so as to provide a more resistant surface to environmental elements, e.g., increased resistance to water. The polish composition comprises a multi-component mixture having effective amounts of each component whereby when the polish composition is applied to the surface and permitted to dry under effective drying conditions a film is formed which is hydrophilic in nature, contains at least one component from said multi-component mixture and may be substantially removed from the surface by rinsing the surface with water. The actual composition of the hydrophilic film to be rinsed away with water contains at least one component of the multi-component polish composition. For example, when the polish composition is a wax-containing polish composition at least a portion of the effective amount of the wax component is present in the dried film which is substantially removed from the surface by rinsing with water while a portion of the wax component is also retained on the surface with other components of the multi-component polish composition to provide a protective layer on the surface.

In one embodiment the novel polish composition and polishing process of this invention arise from the use of multi-component polish compositions having correlated effective amounts of an aminofunctional silicone and a wax component and, optionally a dimethyl silicone. In a further embodiment, a phase-out agent is employed to facilitate formation of a hydrophilic, dry, wax-containing film after application of the polish composition to a painted surface.

It has been discovered that by correlating the effective concentrations of the various components in the instant polish compositions that polish compositions having novel "ease of use" characteristics are provided. Further, the polish compositions provide a glossy appearance to a painted surface after the dried film is rinsed off with water and provide a protective coating to a painted surface.

In another embodiment, the aminofunctional silicone and wax component and, optionally, the dimethyl silicone component, are employed in effective amounts which are correlated to provide a "spray away" polish composition. This process provides several advantages over prior art polishing processes. First, when a polish is applied to an automobile the applier will normally apply some polish in the cracks present as a result of the hood, doors and other abutting automotive parts. Second, the dried polish films formed upon drying of an applied polish composition are removed by buffing the dried film with a cloth. The applied, dried wax-containing film tends to lodge in cracks on the automobile surfaces as it is buffed loose from the painted surface of the automobile. The instant invention overcomes the above-described residual dried wax problem by providing a polish composition having a "spray away" hydrophilic wax-containing film which is substantially removed by water rinsing the dried film from a painted surface until a substantially hydrophobic painted surface is obtained. In addition, this new application/removal process is substantially faster, since the time for application and removal are substantially decreased by both faster application and faster removal. Further, when applied as a paste or liquid the instant polish compositions provide a cleaning action for the surface being polished.

It has been found that by correlating the effective amounts of critical components in the polish compositions of this invention that novel spray-away polish compositions may be formed. The instant polish compositions are preferably formed by having between about 0.05 and about 10.0 weight percent, preferably between about 0.2 and about 7.5 weight percent, phase-out agent (preferably a cationic surfactant), between about 0.05 and about 2.5 weight percent, preferably between about 0.2 and about 2.0 weight percent, aminofunctional silicone and between about 0.5 and about 4.0 weight percent, preferably between about 0.5 and about 3.0 weight percent, wax, all being expressed as weight percent actives. A dimethyl silicone may also be employed in an effective amount between about 0.1 and about 7.5 weight percent. The aforementioned weight percents are provided as the weight percent of the active component and may be provided with other inactive components e.g., a carrier liquid such as water. It is important to note that the aforementioned effective amounts are also correlated to provide the spray-away feature of the instant invention whereby after application of the polish composition to a surface a substantially hydrophilic dried film is formed under effective drying conditions. This dried film is substantially hydrophylic in nature and may be substantially removed from the surface by rinsing with water with a hydrophobic water resistant surface remaining after the water rinsing.

Representative aminofunctional silicones (also referred to as "aminofunctional polysiloxane" and "amine-functional silicone") useful herein are Dow Corning 531, Dow Corning 536 and GE SF1706. Dow Corning 531 aminofunctional silicone polymer is a polydimethyl siloxane which is polar in nature and adheres strongly to painted automobile surfaces. The aminofunctional silicones have excellent detergent resistance, provide durable corrosion resistance, provide deep gloss and are soluble in most aliphatic hydrocarbons. Dow Corning 531 aminofunctional silicone is substantially colorless and has a viscosity in centistokes at 77° F. (25° C.) of 150; a refractive index at 77° F. (25° C.) of 1.410; a specific gravity at 77° F. (25° C.) of 0.860 and a flash point, open cup, of 95° F. The aminofunctional silicones may be present in an amount from about 0.05 parts by weight to about 2.5 parts by weight, based upon actives, depending upon whether a dialkyl siloxane is also employed as an extender for the aminofunctional polysiloxane. If less than about 0.2 parts by weight is used, the polish composition will not have the durability and detergent resistance that is required while greater than about 2 parts by weight results in the formation of a dried film which will not be substantially removed by water rinsing. Dow Corning 536 is an aminofunctional polydimethyl siloxane similar to the Dow Corning 531. The Dow Corning 536 has a light straw color; a viscosity in centistokes at 77° F. (25° C.) of 35; a refractive index at 77° F. (25° C.) of 1.408; a specific gravity at 77° F. (25° C.) of 0.95° F.; and a flash point, open cup, of 95° F. The aminofunctional Dow Corning 536 resin may be present in an amount between 0.05 and about 2.5 parts by weight, based upon actives, with less than about 0.05 being insufficient to provide detergent resistance and durability. Greater than about 2.5 parts by weight is detrimental to the film forming feature of the instant invention since too much aminofunctional silicone will inhibit the formation of a dried film to be removed by water rinsing according to the instant invention. GE SF1706, available from GE Silicones, is an aminofunctional siloxane similar to Dow Corning 531 and Dow Corning 536 and is characterized as an aminoethylaminopropylpolysiloxane having: a clear color; a viscosity in centistokes at 25° C. of 30; a refractive index of about 1.04; a specific gravity at 77° F. (25° C.) of 0.98; and a flash point, open cup, of 165° F. The aminofunctional silicone GE SF1706 may be employed in an amount between about 0.05 and about 2.5 parts by weight, based on actives, in the same manner and for the same effective reasons described above. Other aminofunctional silicones are available from Wacker Silicones Corporation and is designated as F-756. F-756 aminofunctional silicone is substantially clear and has a viscosity at 25° C. of 20 centistokes; a specific gravity of 0.978; a flash point (Pensky-Martens) of 120° F.; and contains 100% actives. International Chemical Inc., an English Corporation, also provides an aminofunctional silicone resin under the trade designation ICI-M466. Aminofunctional silicones employed herein will typically have viscosities between about 15 and about 200 centistokes at 25° C.

The wax component in the instant invention may be a hydrocarbon wax or oxidized microcrystalline hydrocarbon waxes or an emulsion of a wax and include, but are not limited to, such well known waxes as petronauba, carnauba, paraffin, duroxon, Wax S and Wax E. Wax S and Wax E are available from Hoechst Celanese Corporation, Somerville, N.J. A co-wax emulsion available from Concord Chemical Co. Inc. is useful herein and is characterized as a mixture of a natural (e.g., carnauba) and synthetic waxes and is further characterized as having a specific gravity of 1.04 (25° C.), a light brown translucent color, a pH of about 8.6 and a percent solids of about 12 weight percent. The wax component is preferably present in an effective amount between 0.5 and about 4.0 weight percent, based on actives, with the actual effective amount being correlated to the amount of aminofunctional silicone so as to result in the formation of a spray-away hydrophilic dried film when the polish composition is applied to a painted surface and permitted to dry under effective drying conditions.

In addition to the aminofunctional silicone and wax component, the instant invention beneficially employs a phase-out agent to provide for improved affinity of the aminofunctional silicone for the painted surface and improved formation of the spray-away dried film. The phase-out agent is preferably a cationic surface active agent such as a cationic detergent comprising dicoco dimethyl ammonium chloride. Representative of such cationic detergents are Arquad 2C-75 and Variquat K-300. Both contain about 75 weight percent dicoco alkyldimethyl quaternary ammonium chloride and are amber liquids having a specific gravity of about 0.885 (25° C.). ALCASAN 7 LUF may be employed herein and contains about 55 weight percent alkyldimethylbenzylammonium chloride and is an amber liquid having a pH of between 5 and 7 with a density of about 0.95 g/ml at 21° C. Phase-out agents which may be employed herein include surface active agents such as quaternary ammonium salts, quaternized fatty amides, quaternized imideazolines and the like. The phase-out agent may be employed in an effective amount to provide for formation of a spray-away, dried film and when quaternary ammonium salts, such as Arquad 2C-75, may be present in an effective amount between about 0.05 and about 10.0 weight percent, preferably between about 0.2 and about 7.5 weight percent, based upon actives. The effective amount of the phase-out agent is correlated to the effective amounts of the aminofunctional silicone and wax components to provide the beneficial results of providing a painted surface with a hydrophobic layer having gloss and luster after removal of the dried wax-containing film by rinsing with water.

In addition to the critical components (aminofunctional polysiloxane and wax component), it is advantageous to include other components to aid in application of the polish compositions to the painted surfaces and cleaning of the painted surface during application of the polish compositions. Incorporation into the polish composition of a cationic surface active agent, organic solvent and an organic acid have been found to be beneficial in providing for improved application and removal of the instant polish composition. Accordingly, the polish compositions may also contain other beneficial components such as solvents (e.g., alcohols, 2-butoxy ethanol, mineral spirits and the like), paraffins, paraffin oils or other oils (e.g., mineral oils, organic oils and the like), organic acids and mineral acids (e.g., glacial acetic acid, hydrochloric acid and the like), thickeners (e.g., acid thickeners, Bentone LT [hectorite product], quar gums and the like), abrasives for cleaning (Bentone LT, silicas, zeolites and the like), dyes, fragrances and other known components of polish compositions; provided the beneficial spray-away film attribute of the instant invention is maintained by use of such additional components.

A dialkyl silicone fluid may optionally be and is preferably employed as an extender for the aminofunctional silicones and preferably has a viscosity of between about 5 and 20,000 centistokes at 77° F. (25° C.). The dialkyl silicone is preferably a dimethyl silicone fluid which provides luster as well as also providing some additional detergent resistance to the polish. The dimethyl silicone fluid may be present in an amount of from 0 parts by weight to about 7.5 parts by weight. When such a dialkyl silicone is employed the gloss and appearance uniformity of the treated painted surface is improved.

The instant invention also applies to a process for polishing a painted surface to provide a protective coating for a surface, e.g., a painted surface. Representative painted surfaces are those commonly used for automobiles, trucks, boats, airplanes, motorcycles and etc. The process comprises applying to said painted surface a polish composition comprising a multi-component mixture which when applied to the painted surface under effective drying conditions forms a substantially dry hydrophilic film which may be substantially removed from the painted surface by water rinsing of the painted surface whereby a hydrophobic painted surface remains. The polish composition is permitted to dry under effective drying conditions to form a hydrophilic film. It has been observed that this hydrophilic film is not easily removed by buffing with a cloth, since upon buffing with a cloth smearing of the polish composition has been observed. The hydrophilic film is substantially removed from the painted surface by rinsing the painted surface with water whereby the painted surface retains thereon at least one component of said multi-component mixture.

In one embodiment the polish composition of the instant invention comprises about the following compositional ranges of components:

|  | WT. PERCENT (AS ACTIVES) |
|---|---|
| Cationic Surfactant | 0.05 to 10.0 |
| Dialkyl Silicone | 0.0 to 7.5 |
| Aminofunctional Silicones | 0.05 to 2.5 |
| Paraffin and/or Paraffin Oil | 0.0 to 15.0 |
| Solvent | 2.0 to 10.0 |
| Thickener | 0.0 to 5.0 |
| Fragrance and/or Dye | q.s. |

-continued

|  | WT. PERCENT (AS ACTIVES) |
|---|---|
| Acid | 0.05 to 1.5 |
| Nonionic or Other Surfactant | 0.0 to 10.0 |
| Wax | 0.5 to 4.0 |
| Water | 35 to 98 |

In a further embodiment the instant invention comprises about the following composition:

|  | WT. PERCENT |
|---|---|
| Deionized Water | 72.63 |
| Ammonium Hydroxide | 0.25 |
| (0.28 wt. % Ammonia) |  |
| Bentone LT (hectorite) | 1.25 |
| Acetic Acid, Glacial | 0.20 |
| Cationic Surfactant | 6.70 |
| Isopropanol | 0.32 |
| 2-Butoxy Ethanol | 3.00 |
| Dimethyl Silicone | 4.50 |
| Co-Wax Emulsion | 10.00 |
| Aminofunctional Silicone | 1.00 |
| Fragrance | 0.15 |

The instant polish compositions may be employed by applying the polish composition to a painted surface, allowing the polish composition to dry under effective drying conditions to form a substantially dry film and then rinsing away the substantially dry film from the painted surface upon which it has formed. The polish composition is preferably applied as a paste or liquid by rubbing it on the surface whereby a cleaning action is provided during application. The effective drying conditions under which polish compositions dry are well known and are typically temperatures between about 50° F. and about 90° F. with relative humidities between about 20% and 80% being typical. The water rinsed painted surface is preferably dried with a dry cotton cloth or chamois to remove droplets of water which may dry to form water spots.

EXAMPLE I

A polish composition ("Polish A") according to the instant invention was prepared by employing the following amounts of the following components:

| COMPONENTS | WT. % |
|---|---|
| Deionized Water | 70.95 |
| Ammonium Hydroxide (Aqueous)[5] | 0.25 |
| Bentone LT | 1.25 |
| Acetic Acid, Glacial | 0.20 |
| Arquad 2C-75 | 6.70 |
| Isopropanol | 2.00 |
| 2-Butoxy Ethanol | 3.00 |
| Dimethyl Silicone (350 cs)[1] | 4.50 |
| Co-Wax Emulsion[3] | 10.00 |
| Aminofunctional Silicone[2] | 1.00 |
| Fragrance[4] | 0.15 |
|  | 100.00 |

[1]Dimethylpolysiloxane available from Union Carbide Chemicals and Plastics under the designation Silicone Fluid L-45.
[2]Aminofunctional Silicone GE SF1706.
[3]Co-Wax emulsion available from Concord Chemical Co. Inc. with 12 weight percent solids.
[4]Aromatic Oil having a yellow color with a herbal mint odor.
[5]0.28 weight percent ammonia.

Polish A was prepared by placing 60° F. deionized water in a stainless steel container equipped with stirring. The pH is adjusted by addition of the dilute ammonium hydroxide until the pH is about 8.5 or greater. The mixture is then stirred while the Bentone LT is slowly added as the water and Bentone LT mixture begins to thicken. The remaining components are then added in the following order:

1. Acetic Acid, Glacial
2. Arquad 2C-75
3. Isopropanol
4. 2-Butoxy Ethanol
5. Dimethyl Silicone
6. Co-Wax Emulsion
7. Aminofunctional Silicone
8. Aromatic Oil The resulting mixture was then stirred for two hours and filtered to remove suspended matter and was observed to have a pH of 4.5.

A second polish composition according to the instant invention ("Polish B") was prepared according to the procedure for Polish A by increasing the weight percent of aminofunctional silicone to 1.5 weight percent and decreasing the weight percent of deionized water by 0.5 weight percent and had a pH of 5.0.

Polish A and Polish B each contained less than about 7 weight percent VOCs.

EXAMPLE II

The products (Polish A and Polish B) prepared in Example I were evaluated against two commercial polish compositions Turtle Wax[R] Hard Shell Car Paste Wax and SIMONIZ[R] Super Blue Liquid for ease of application, degree of water beading retention, gloss, and time for application. Turtle Wax Hard Shell Car Wax (Turtle Wax Paste) and SIMONIZ Super Blue Liquid, are recognized leaders in the field of automotive wax products. The comparative evaluation was conducted in the State of Connecticut during the month of July on six (6) automobiles. Data was accumulated at the start of the comparative evaluation, and at two week intervals for four (4) weeks, and at the end of four (4) weeks.

Each polish product was evaluated on each automobile by selecting four areas (blocks) on each automobile and testing four areas in each selected area with polish candidates or using one area as a control. The overall design is referred to as a balanced incomplete block design and is described in *Experimental Designs*, W. C. Cochran and G. M. Cox, 2nd Edition. The polishes being evaluated and the control are randomly assigned to each test area and no polish or control appeared more than once in each of the four test blocks on each automobile and no polish appeared more than three times on any test automobile. The control appeared in every block; i.e., four times per automobile. The test array results in each polish being tested at three different areas on each automobile for a total of eighteen test areas for each polish. The evaluations were conducted on the mainly horizontal surfaces of the automobiles because experience has shown that exposure to sunlight, rain, and atmospheric fallout causes more severe weathering on these horizontal surfaces. In addition, gloss and water beading are normally determined by observation of the horizontal surfaces of automobiles.

The automobiles employed in the comparative evaluation were selected to represent a variety of manufacturers, ages, colors, and paint conditions. Both clear coat and non-clear coat paints were included in the evaluation. The test automobiles ranged in age from 1985 to 1991 models were as shown below in Table I.

TABLE I

| Test Automobiles | | | | |
|---|---|---|---|---|
| Model | Year/Color | Paint Type | Initial Finish Condition | Odometer Reading |
| Pontiac Grand Prix | 1991/Dark Blue | Clear Coat | Dull | 16,444 |
| Dodge 600 | 1985/Black | Non-Clear Coat | Dull | 56,428 |
| Ford Taurus | 1991/Dark Red | Clear Coat | Dull | 1,087 |
| Ford Taurus | 1991/Navy Blue | Clear Coat | Dull | 2,025 |
| VW Jetta | 1988/Brown | Clear Coat | Dull | 104,457 |
| Pontiac Grand Prix | 1991/Black | Clear Coat | Dull | 16,221 |

Test Polish Composition Application Procedure

Immediately before application of the polish compositions, each test automobile was hand washed with Simoniz Super Blue Car Wash, available from First Brands Corporation, Danbury, CT., following label directions and using a boars bristle brush designed for washing cars. The test was conducted under hot summer conditions in Danbury, Connecticut, since hot summer conditions have been found to be detrimental to polished, painted automotive surfaces. After rinsing with clear water, each test automobile was hand dried with 100% cotton towels. The test automobiles were washed and dried in the same manner immediately before each subsequent evaluation.

The test polish products were applied to the test automobiles in an array utilizing a partially balanced, incomplete block design. Since Polish A and Polish B are removed by rinsing with water, Polish A and Polish B were first applied, permitted to dry (a dry wax-containing film is formed) and removed by rinsing with water. The surface was then dried. The remaining paste and liquid polish products were then applied and removed by buffing according to label directions. The test polish products were situated so observers compared only two, unidentified polish test areas of one of the four blocks at one time. That is, each car is a single replicate of a balanced design for four treatments in sets of three. The patterns on the test automobiles were chosen as the three permutations of four items in a square array and the front of the car was randomly chosen. Scoring was based on side by side comparisons of the test areas. This evaluation system permits each polish to be compared directly to a polished area and directly or indirectly to an unpolished control area. The Turtle Wax Paste and Simoniz Super Blue Liquid polish products were applied to the test automobiles according to directions printed on their containers. The two commercial polish compositions were allowed to dry to a haze, and then buffed using a clean, soft cloth to an even gloss. The cloth was turned frequently to prevent smearing.

Rating System

Car polish protective films are primarily destroyed by attrition due to weathering. Such is evidenced by reduction of gloss and water beading as seen on automobiles in normal use. Therefore, the polish life on an automobile can be determined by comparing a polished area on an automobile with an unpolished control. Polish life is exhausted when gloss and water beading of the polished area are no longer noticeably different from the control areas. High gloss is considered to be a condition where the surface is very reflective (mirror-like) as opposed to dull. High gloss from an automobile polish is often accompanied by an intensification of color. Water beading is a function of the hydrophobic nature of an automobile paint surface. A water droplet on a hydrophobic surface such as one freshly polished will show a high contact angle, and the water droplet will be small, uniform, and spherical in shape. As weathering destroys the polish film, it reduces the water beading characteristics of the film. As water beading is reduced, the automobile surface becomes less hydrophobic, the water beads become larger and flatter in appearance, and the water beads eventually tend to "sheet" or flatten out.

Three observers were used to evaluate all test areas on all the test automobiles using an evaluation form containing instructions. The evaluation form allows the observers to rate each test section by close visual inspection and to make a comparison of that section with the one next to it. If the areas are equal they are rated as such. If one section is noticeably better than the area next to it a rating of 1 is assigned to the better area. If the areas differ by a substantial amount, a rating of 2 is given to the "much better" area. First gloss was rated. Then the car was sprayed with water to simulate rain and water beading characteristics were evaluated. Three observers were used in each rating session. The observers were unaware of which areas were control areas or which were polished with a test polish. Nor were they made aware of the positioning of the test polishes. At the end of each inspection period, the raw observer data is collected. Analysis of this data allows the polishes to be compared to the control or to each other.

The test polishes on six cars at each evaluation period were scored as follows as compared to other polish compositions or to a control:

|  | SCORE |
|---|---|
| (1) Much better | 2 |
| (2) Better than | 1 |
| (3) Equal to | 0 |
| (4) Worse than | −1 |
| (5) Much worse | −2 |

The data obtained in this test was analyzed to determine differences.

As stated previously, one block contained test areas for three polishes and a control, unpolished area. After the blocks were evaluated, a score was derived for each polish in a block. In both performance tests the "raw" scores were recorded. The score represented how an individual polish compared to the control. Two of the polishes were directly adjacent to the control. The scores for these two polishes were taken directly from the recorded raw scores. A third polish which was diagonally across from the control was scored algebraically. This was accomplished by adding all four ratings together and dividing the total by two. Using a rating system from zero to two actually allows for a score to range from a negative four to a positive four. For example, if the polished area is much worse than the control area, that particular polished area would receive a score of negative two. The test results show that the test polish areas of the invention throughout the four (4) week test period were comparable or better in gloss and water beading than the control areas. The evaluator data for each polish area compared to the cleaned-only control area for each time period and each property, i.e., gloss or water beading, as part of the statistical analysis ratings are averaged. On any individual test area a maximum rating of 4 is possible and a minimum rating of −4 is possible for the range of individual test area ratings. In this regard, the maximum possible overall average evaluator rating in the test is 2.7. This is because the observers were asked to indicate as many as two degrees of superiority of one test area over another. The average observer ratings were derived by totalling the evaluator scores algebraically and dividing the sum by the number of observations per time period per property. From experience, an average evaluator rating for a polish area compared to a cleaned-only control area above 0.5 shows a reasonable difference between the polishes being compared or between a polish area and a cleaned-only control area. A rating below 0.5 indicates little difference or benefit. Thus, ratings below 0.5 show that the polish is obviously weathered. Such polished areas are distinguishable from cleaned-only control areas only by very close observation which cannot be related to any benefit for the polish user.

It can be seen that the average evaluator initial gloss ratings for the polish compositions of this invention were superior to the commercial waxes and that after a two (2) week test period the four polish compositions had comparable gloss. It can also be seen that the average evaluator gloss ratings for higher aminofunctional silicone-containing composition (Polish B) maintained a higher gloss throughout the test. Thus, it may be concluded from the foregoing test results that the actual average evaluator gloss ratings for the polish compositions are given below in Table II.

TABLE II

| | Average Evaluator Gloss Ratings vs. Clean Paint (Cleaned-Only Controls) | | | |
|---|---|---|---|---|
| Test Period | Polish A | Polish B | Turtle Wax (Paste) | Simoniz Wax (Liquid) |
| Initial | 1.12 | 1.27 | 0.77 | 1.09 |
| 2 Weeks | 0.19 | 0.46 | 0.55 | 0.24 |
| 4 Weeks | 0.07 | 0.18 | 0.19 | 0.10 |

The average evaluator water beading ratings for the polish composition and the Turtle Wax Paste and Simoniz Wax Liquid polish products are shown in Table III.

TABLE III

| | Average Evaluator Water Beading Ratings vs. Controls | | | |
|---|---|---|---|---|
| Test Period | Polish A | Polish B | Turtle Wax (Paste) | Simoniz Wax (Liquid) |
| 2 Weeks | 1.22 | 1.73 | 1.13 | 0.76 |
| 4 Weeks | 0.54 | 0.85 | 0.27 | 0.01 |

It can be seen from Table III that the average evaluator water beading ratings for the Polish A and Polish B compositions were well above the values reported for the commercial polishes throughout the four (4) week test period. In comparison, it can be seen from Table III that the average evaluator water beading ratings for Turtle Wax Paste falls to only 50% of Polish A and only 32% of Polish B at the four (4) week test period. Therefore, it may be concluded from the foregoing test results that the polish compositions of the instant invention had a useful polish water beading life in excess of four (4) weeks and at four (4) weeks provided superior water beading when compared to the two commercially available polishes.

EXAMPLE III

Polish A from Example I was employed in this example. The commercially available Turtle Wax Paste product from Example II and commercially available Nu Finish liquid polish were evaluated to determine the total time required to apply and remove each polish composition. Each polish composition was employed to polish a large automobile and a small automobile as follows by random assignment:

| AUTOMOBILE | POLISH |
|---|---|
| 1991 Red Ford Taurus | Nu Finish |
| 1991 White Ford Taurus | Turtle Wax |
| 1991 Silver Ford Taurus | Polish A |
| 1986 White Honda Civic | Turtle Wax |
| 1990 White Saab Turbo 900 | Nu Finish |
| 1990 White Honda Si | Polish A |

Each car is prepared by washing the car by the procedure described in Example II, above. Each car is polished and the time for application of the polish recorded. The polish is then permitted to dry. The drying time was not recorded, but the drying time was observed to be similar for each polish tested. The dry film is then removed by buffing (Turtle Wax Paste and Nu Finish liquid) with a 100% cotton cloth or by rinsing off with water (Polish A) from a garden hose followed by drying the car with a 100% cotton cloth. The time for removal of the dried film was recorded for each car. The following results were obtained (reported in minutes):

| AUTOMOBILE | POLISH | APPLY TIME[1] | REMOVAL TIME[1] | TOTAL TIME[1] |
|---|---|---|---|---|
| 1991 Red Ford Taurus | Nu Finish | 25 | 19 | 44 |
| 1991 White Ford Taurus | Turtle Wax | 21 | 19 | 40 |
| 1991 Silver Ford Taurus | Polish A | 11 | 8 | 19 |
| 1986 White Honda Civic | Turtle Wax | 19 | 17 | 36 |
| 1990 White Saab Turbo 900 | Nu Finish | 16 | 16 | 32 |
| 1990 White Honda Si | Polish A | 8 | 6 | 14 |

[1]All times in minutes.

The above dramatic difference in the apply and removal times for the two commercial polishes as compared to Polish A is the result of the unique spray-away feature of the instant invention. When applying the polish to the car it is no longer necessary to carefully avoid insignias, cracks and crevices where dried wax will be difficult to remove by buffing. Since removal of the dry film formed by Polish A will be by rinsing the car with water and then drying, the person applying Polish A need not be concerned about avoiding such areas. Hence, a faster more worry-free application of the polish. This spray-away feature is also beneficial in removal of the dried film formed by Polish A, since no buffing is required. The dried film formed after Polish A dries is rinsed away with a simple water rinse from an outdoor garden hose. The water is then preferably dried from the surface to prevent water spotting (owing to mineral components commonly found in water). The net result of these benefits is the observed dramatic decrease in the total time for polishing a car of over 50%.

Polish C was prepared according to the procedure described for Polish A in Example I, except 0.32 weight percent isopropanol and 72.63 weight percent water were employed. Polish C contained 5.3 weight percent VOCs. Polish C was compared to Polish A according to the application/removal procedure described in this Example III for Polish A and observed to require substantially the same time for application and removal as Polish A.

What is claimed:

1. A polish composition for a surface of a vehicle wherein said polish composition comprises a multi-component mixture with components in effective amounts which when applied to the surface of a vehicle under effective drying conditions forms a substantially dry hydrophilic film containing at least one of said components of the multicomponent mixture which may be substantially removed from said surface by water rinsing of said surface; contains at least one wax component and at least one aminofunctional silicone and said surface is a painted surface; and wherein said polish composition comprises about:

| COMPONENT | WT. PERCENT (Actives) |
|---|---|
| Cationic Surfactant | 0.05 to 10.0 |
| Dialkyl Silicone | 0.0 to 7.5 |
| Aminofunctional Silicone | 0.05 to 2.5 |
| Paraffin Oil | 0.0 to 15.0 |
| Solvent | 2.0 to 10.0 |
| Thickener | 0.0 to 5.0 |
| Fragrance/Color | q.s. |
| Acid | 0.05 to 1.5 |
| Nonionic Surfactant | 0.0 to 10.0 |
| Wax | 0.5 to 4.0 |
| Water | 35 to 98 |

2. A polish composition for a surface of a vehicle wherein said polish composition comprises a multi-component mixture with components in effective amounts which when applied to the surface of a vehicle under effective drying conditions forms a substantially dry hydrophilic film containing at least one of said components of the multicomponent mixture which may be substantially removed from said surface by water rinsing of said surface; contains at least one wax component and at least one aminofunctional silicone and said surface is a painted surface; and wherein said polish composition comprises:

| COMPONENT | WT. PERCENT |
|---|---|
| Water | 72.63 |
| Ammonium Hydroxide (0.28 wt % NH$_3$ | 0.25 |
| Thickener | 1.25 |
| Acetic Acid, Glacial | 0.20 |
| Quaternary Ammonium Surfactant | 6.70 |
| Isopropanol | 0.32 |
| 2-Butoxy Ethanol | 3.00 |
| Dimethyl Silicone | 4.50 |
| Co-Wax Emulsion (12 Wt % wax) | 10.00 |
| Aminofunctional Silicone | 1.00 |
| Fragrance | 0.15 |

3. A process for polishing a surface to provide a protective coating for said surface wherein said process comprises: applying to said surface a polish composition comprising a multi-component mixture which when applied to the surface under effective drying conditions forms a substantially dry hydrophilic film which may be substantially removed from said surface by water rinsing of said surface; permitting said polish composition to dry under effective drying conditions to form said hydrophilic film; and removing said hydrophilic film from said surface by rinsing the surface with water whereby said surface retains thereon at least one component of said multi-component mixture.

4. A process according to claim 3 wherein said surface is a painted surface and said polish composition comprises a wax-containing polish composition containing at least one wax component and at least one aminofunctional silicone component.

5. A process according to claim 4 wherein said composition contains a phase-out component whereby after drying of said polish composition to form a film on said painted surface said film may be substantially removed by rinsing said painted surface with water.

6. A process according to claim 5 wherein said phase-out component is a cationic surfactant selected from the group consisting of quaternary ammonium salts, quaternized fatty amides, quaternized imideazolines and mixtures thereof.

7. A process according to claim 6 wherein said phase-out agent is dicoco dialkyl ammonium chloride.

8. A process according to claim 3 wherein said composition comprises effective amounts of at least one wax component, at least one aminofunctional silicone, at least one phase-out component effective in forming a water soluble dry film after application of said polish composition to a surface, a volatile solvent and an organic acid.

9. A process according to claim 8 wherein said wax component is a co-emulsion of natural and synthetic waxes, said aminofunctional silicone is characterized by a viscosity of between about 5 and about 200 centistokes at 25° C., said phase-out component is dicocco dimethyl ammonium chloride, said solvent is a mixture of isopropanol and 2-butoxy ethanol and said organic acid is glacial acetic acid.

10. A process according to claim 8 wherein the effective amounts of said wax component, said aminofunctional silicone and said phase-out component are correlated to provide a hydrophilic wax-containing dried film removable by rinsing after application of said polish composition to said painted surface and after air drying under effective drying conditions.

11. A process according to claim 3 wherein said polish composition comprises a wax component, an aminofunctional silicone, a solvent and a cationic surfactant present in correlated effective amounts for controlling the affinity of said wax and said aminofunctional silicone to said paint surface whereby a wax-containing hydrophilic film is formed under effective drying conditions after application of the polish composition to said painted surface wherein said wax-containing hydrophilic layer may be substantially removed by water rinsing when such wax-containing hydrophilic layer is substantially dry.

12. A process according to claim 11 wherein said aminofunctional silicone is provided in a correlated effective amount to said wax present in an effective amount between about 0.5 and about 4.0 weight percent and said aminofunctional silicone is present in an effective amount between about 0.05 and about 2.5 weight percent to provide for the removal of said substantially dry wax by rinsing with water.

13. A process according to claim 11 wherein an dialkyl silicone is provided in an effective amount.

14. A process according to claim 3 for providing a protective coating to a painted surface comprising applying to said painted surface a composition containing effective amounts of at least one wax component, an aminofunctional silicone and a cationic surface active agent for controlling the affinity of said wax and said aminofunctional silicone for said painted surface whereby said wax may be substantially removed by rinsing with water when substantially dry.

15. A process according to claim 9 for polishing a painted surface of an automobile comprising the following steps:
(1) applying said polish composition of claim 28 to said painted surface of an automobile;
(2) permitting said polish composition on said painted surface to dry under effective air drying conditions of temperature and relative humidity whereby a hydrophilic wax-containing dried film is formed on said painted surface;
(3) removing said hydrophilic wax-containing dry film by rinsing said painted surface with water;

16. A process according to claim 15 involving the additional step of:
(4) drying the water rinsed paint surface with a cloth.

17. A process according to claim 3 wherein said pH of said polish composition is between about 3.5 and about 7.0.

18. A process according to claim 17 wherein said pH of said polish composition is between about 4.0 and about 5.0.

19. A process according to claim 3 wherein said volatile organic compounds in said polish composition are less than about 10 weight percent.

20. A process for polishing a surface to provide a protective coating for said surface wherein said process comprises: applying to said surface a polish composition comprising a multi-component mixture which when applied to the surface under effective drying conditions forms a substantially dry hydrophilic film which may be substantially removed from said surface by water rinsing of said surface; permitting said polish composition to dry under effective drying conditions to form said hydrophilic film; and removing said hydrophilic film from said surface by rinsing the surface with water whereby said surface retains thereon at least one component of said multi-component mixture; and wherein said polish composition comprises about:

| COMPONENT | WT. PERCENT AS ACTIVE |
|---|---|
| Cationic Surfactant | 0.2 to 2.5 |
| Dialkyl Silicone | 0.0 to 7.5 |
| Aminofunctional Silicones | 0.2 to 2.0 |
| Paraffin Oil | 0.0 to 15.0 |
| Solvent | 2.0 to 5.0 |
| Thickener | 0.0 to 5.0 |
| Fragrance | q.s. |
| Acid | 0.05 to 1.5 |
| Nonionic or Other Surfactant | 0.0 to 10.0 |
| Wax | 0.5 to 4.0 |
| Water | 35 to 98 |

21. A process according to claim 20 wherein said polish composition comprises about:

| COMPONENT | WT % |
|---|---|
| Deionized Water | 72.63 |
| Ammonium Hydroxide (1 wt. %) | 0.25 |
| Thickener | 1.25 |
| Acetic Acid, Glacial | 0.20 |
| Quaternary Ammonium Surfactant | 6.70 |
| Isopropanol | 0.32 |
| 2-Butoxy Ethanol | 3.00 |
| Dimethyl Silicone | 4.50 |
| Co-Wax Emulsion (12 wt % wax) | 10.00 |
| Aminofunctional Silicone | 1.00 |
| Fragrance | 0.15 |

22. A process according to claim 20 wherein said polish composition comprises about:

| COMPONENT | WT. PERCENT (AS ACTIVES) |
|---|---|
| Quaternary Ammonium Surfactant | 0.2 to 2.5 |
| Dimethyl Silicone | 0.0 to 7.5 |
| Aminofunctional Silicones | 0.2 to 2.0 |
| Paraffin Oil | 0.0 to 15.0 |
| Solvent | 2.0 to 5.0 |
| Thickener | 0.0 to 5.0 |
| Organic Acid | 0.05 to 1.5 |
| Nonionic Surfactant | 0.0 to 10.0 |
| Wax | 0.5 to 4.0 |
| Water | 35 to 98 |

* * * * *

UNITED STATES PATENT AND TRADEMARK OFFICE
CERTIFICATE OF CORRECTION

PATENT NO. : 5,330,787
DATED : July 19, 1994
INVENTOR(S) : David R. Berlin; Bonnie A. Rishel; Richard L. Wolstoncroft It is certified that error appears in the above-identified patent and that said Letters Patent is hereby corrected as shown below:

Column 8, line 64: Change footnote 5 from: "0.28 weight percent ammonia" to "28% ammonia min."

Signed and Sealed this

Seventh Day of March, 1995

Attest:

BRUCE LEHMAN

Attesting Officer     Commissioner of Patents and Trademarks